W. F. BOUCHÉ.
CONNECTION BOX.
APPLICATION FILED NOV. 23, 1911.

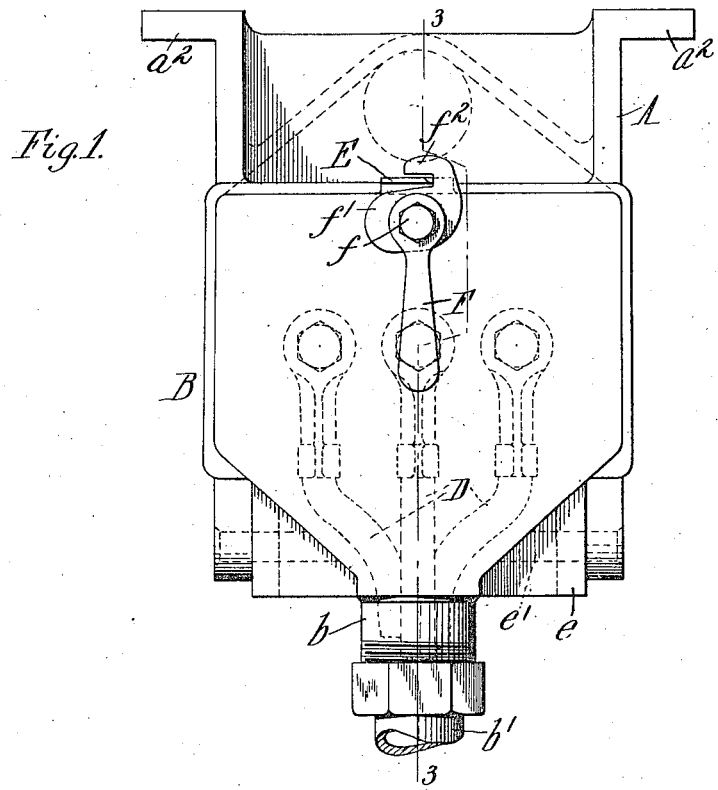
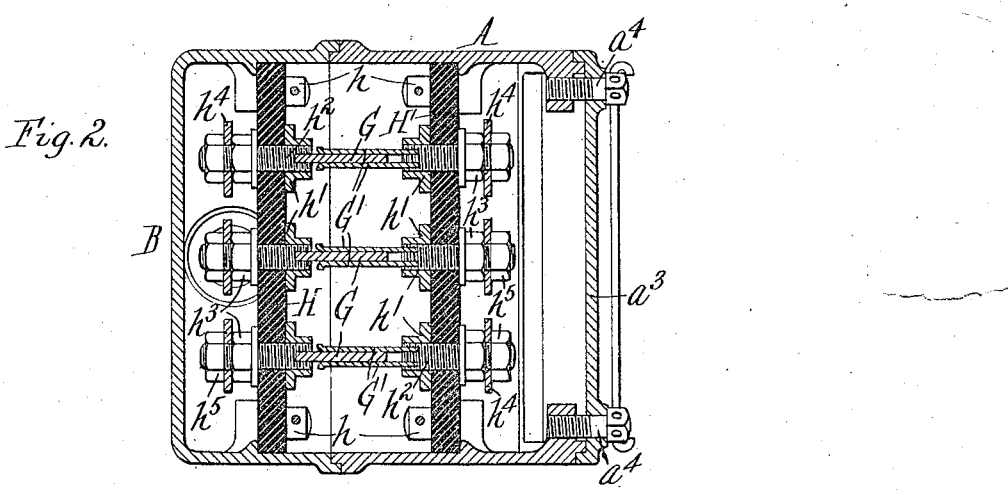

1,153,019.

Patented Sept. 7, 1915.
2 SHEETS—SHEET 2.

Witnesses:

Inventor
William F. Bouché,
Attorneys

UNITED STATES PATENT OFFICE.

WILLIAM F. BOUCHÉ, OF BUFFALO, NEW YORK, ASSIGNOR TO GOULD COUPLER COMPANY, OF NEW YORK, N. Y.

CONNECTION-BOX.

1,153,019.	Specification of Letters Patent.	Patented Sept. 7, 1915.

Application filed November 23, 1911. Serial No. 661,992.

*To all whom it may concern:*

Be it known that I, WILLIAM F. BOUCHÉ, a citizen of the United States, residing at Buffalo, in the county of Erie and State of New York, have invented a new and useful Improvement in Connection-Boxes, of which the following is a specification.

This invention relates to connection boxes of the kind which are used for connecting two conductors or two parts of a circuit in such a manner that they can be readily disconnected and which are composed of two movably connected parts which carry the terminals of the conductors or parts of a circuit which are to be joined.

The objects of the invention are to produce a connection box of novel construction in which the parts of the switches or electrical connections are mounted on insulating plates which are so secured in the parts of the box as to be readily removable therefrom for inspection or repair when the parts of the box are separated; also to produce a box in which the separation of the parts of the box is resisted by the switches; also to provide novel means for securely holding the parts of the box together.

The connection box constituting the subject of this application is more particularly intended for use in car lighting systems in which the generator is mounted on the car truck and in which it is necessary to frequently disconnect two parts of a circuit, for example, the generator from the lighting circuits of a car in order to test the system, but the connection box is not necessarily limited to this use.

Figure 3:
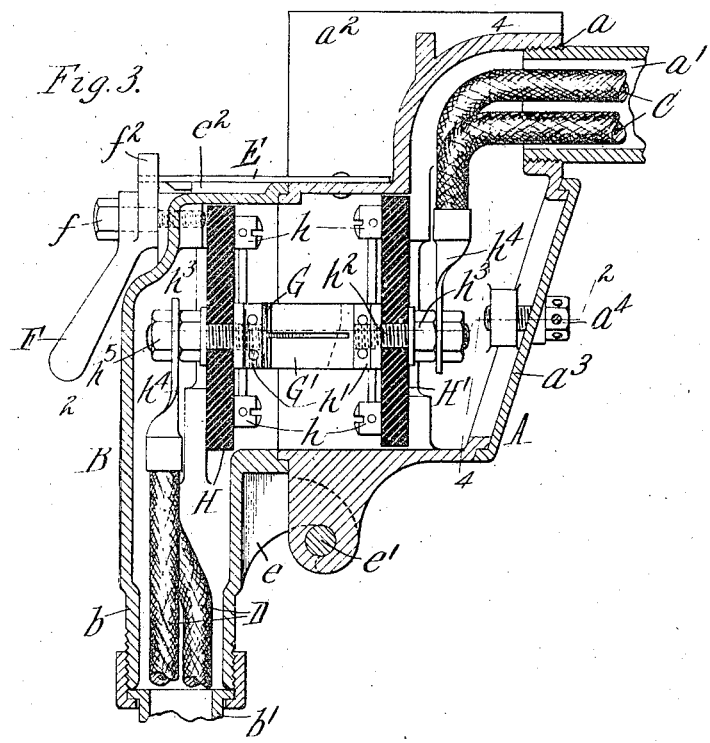
Figure 4:
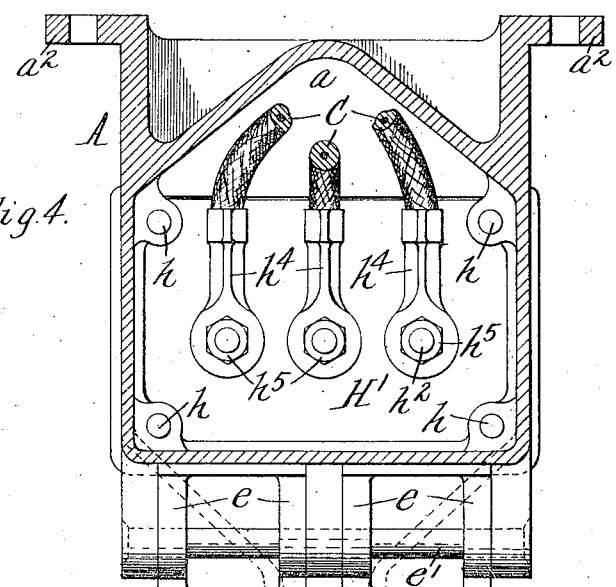

In the accompanying drawings consisting of two sheets: Figure 1 is a front elevation of a connection box embodying the invention. Fig. 2 is a sectional plan thereof on line 2—2, Fig. 3. Fig. 3 is a longitudinal sectional elevation thereof on line 3—3, Fig. 1. Fig. 4 is a rear elevation thereof, partly in section, on line 4—4, Fig. 3.

Like reference characters refer to like parts in the several figures.

The electrical connections of the connection box are contained in a two part casing, comprising a relatively stationary or fixed part A which is adapted to be fixed to a suitable support, and a part B which is detachably secured to the fixed part and is adapted to be removed therefrom. In the construction shown the fixed part A of the casing is provided with an opening $a$ in which a conduit or container $a'$ is secured and through which the conductor or conductors C of one part of the circuit enter the casing, and the other part B of the casing has a reduced lower portion $b$ to which a flexible conduit or container $b'$ is secured and through which the conductor or conductors D of the other part of the circuit enter the casing. Suitable means are provided for securing the stationary part A of the casing to the car or other support, such, for instance, as lugs $a^2$ provided with holes for securing bolts or the like. The part A of the casing is also preferably provided in its rear end with an opening which is closed by a suitable lid or cover plate $a^3$, which may be secured to the casing by screws $a^4$, or other fastenings permitting the cover to be removed. All of these parts of the connection box may be of any desired or suitable construction. The device is shown in the drawings as connecting three sets of conductors, but it will be understood that the connection box can be equally well used for connecting the ends of one or any number of sets of conductors.

The removable part B of the casing can be detachably secured to the stationary part A in any suitable way. As shown in the drawings, the parts are connected by hooks $e$ on the lower portion of the removable part B of the casing which engage with a rod $e'$ secured to the fixed part A, and a spring latch E which is secured to the part A of the casing and engages with a projection $e^2$ on the removable part. The hooks are shaped to permit the removable part B to be swung downwardly about the rod $e'$ when the latch is disengaged from the projection $e^2$, and unhooked therefrom, thus enabling the part B to be removed from the stationary part of the casing.

In order to facilitate the releasing of the latch and to prevent the accidental opening of the box, a latch operating lever or handle F is preferably employed. This lever is pivoted at $f$ on the removable part B of the casing and is provided with a cam portion $f'$ which is adapted to engage the free end of the latch E and raise the same out of engagement with the projection $e^2$ when the lever is turned in one direction, and with a hooked portion $f^2$ which in the normal position of the lever extends over the end of the latch and prevents the same from being disengaged from the projection $e^2$.

The ends of the companion conductors C and D are fastened in any suitable manner to the coöperating members of a knife switch, which comprises a blade member G and a member G' consisting of a pair of spring plates adapted to embrace and grip the blade. The blade members G of the several switches are secured in one part of the casing, for instance, the part B, while the other members G' are secured in the other part A of the casing, so that the switches are adapted to electrically connect the conductors C and D when the connection box is closed or the two parts thereof are secured together, and to disconnect the conductors when the connection box is opened or the parts thereof separated. By using a switch of this kind, a good electrical contact is obtained and the two members of the switch are held in engagement by friction, so that if the latch for the two parts of the casing should become accidentally released, the switches would resist the separation of the parts of the casing. The blade and female members of the switches are preferably mounted respectively on suitable insulating bases or plates H H' which are removably secured respectively in the removable and fixed parts of the casing by screws $h$ or other suitable means. By mounting all the blade members G on one insulating plate H and all the female members G' on another plate H' and removably securing each of these plates in one part of the casing in the manner described, the insulating plates and the parts of the switches carried thereby can be readily removed from the casing by merely separating the parts A and B of the casing and unscrewing the screws or bolts $h$. This construction greatly facilitates the inspection and repair of the connection box and it is not necessary to provide the removable part B of the casing with a removable cover or plate to afford access to the connections between the conductors and the switch members. A decided advantage is thus secured, since the first cost of manufacturing and fitting the parts is reduced, and a separate cover is furthermore objectionable because it forms another joint in the casing to keep tight and it is liable to work loose and become detached and lost. The fixed part of the casing is made with the removable cover $a^3$ because this part of the casing is stationarily secured in place, frequently in an inaccessible location, and the removable cover affords an additional means of access to the connections, but a removable cover for the movable part B of the casing is not required.

The switch members can be secured to the insulating plates H H' in any suitable or usual manner, for instance, the blades G and plates G' are secured in blocks $h'$ which are fastened by screw studs $h^2$ and nuts $h^3$ to the insulating plates. The ends of the conductors C and D are connected with the studs $h^2$ at the inner side of the insulating plates by means of the usual lugs or connectors $h^4$ which may be clamped on the studs between the nuts $h^3$ and nuts $h^5$.

When it is desired to inspect the connection box or to test the circuits, it is merely necessary to turn the lever F and to swing the removable part B of the box downwardly about the rod $e'$; whereby the blades of the switches are withdrawn from the spring members. If it is desired to separate the parts of the casing, the removable part can readily be unhooked from the stationary part. In order to inspect or repair the connections between the parts of the switch and the conductors D, the isulating base H can be removed from the part B of the casing and the conductors connected therewith partly drawn through the conduit $b'$ and the opening in the casing. The connections between the switch members G' and the conductors C are accessible by similarly removing the insulating plate H' or by removing the cover plate $a^3$ of the part A of the casing.

The connection box consists of the minimum number of parts, which is a very desirable feature in devices of this kind when used on railroad cars, since the constant vibration and jar to which the parts are subjected will tend to loosen the connections between the different parts. The parts of the device are all securely connected and joined in such a manner as to prevent their separation or loosening while in use.

I claim as my invention:

In a connection box, the combination of a casing comprising a relatively fixed part and a part which is movably connected to said fixed part and which is of unitary structure and has integral side, top and rear walls, said parts having open meeting ends, insulating plates secured in said parts and removable through said open ends thereof when said movable part is detached from said fixed part, conductors entering said parts and located between the outer walls thereof and said plates, and coöperating knife switch members on the faces of said plates adjacent to the open ends of said parts, said switch members having parts extending through said plates and to which the conductors are adapted to be secured at the opposite faces of said plates, said plates with said switch members mounted thereon being adapted to be removed from said movable part of the casing through said open end when the parts are separated to afford access to the rear faces of said plates.

Witness my hand this 21st day of November, 1911.

WILLIAM F. BOUCHÉ.

Witnesses:
  A. L. McGee,
  C. W. Parker.